United States Patent [19]

Varjonen et al.

[11] Patent Number: 5,216,243
[45] Date of Patent: Jun. 1, 1993

[54] SAMPLE CHANGER MECHANISM FOR RADIOACTIVE SAMPLES IN GAMMA COUNTER FOR USE IN MASS SURVEY

[75] Inventors: Markku Varjonen; Aarne Heinonen, both of Turku, Finland

[73] Assignee: Wallac Oy, Turku, Finland

[21] Appl. No.: 761,944

[22] PCT Filed: Mar. 21, 1990

[86] PCT No.: PCT/FI90/00072
§ 371 Date: Sep. 23, 1991
§ 102(e) Date: Sep. 23, 1991

[87] PCT Pub. No.: WO90/11537
PCT Pub. Date: Oct. 4, 1990

[30] Foreign Application Priority Data

Mar. 22, 1989 [FI] Finland .................................. 891353

[51] Int. Cl.5 .................................................. G01T 7/08
[52] U.S. Cl. ......................................... 250/328; 250/366
[58] Field of Search .................... 250/328, 366, 361 R

[56] References Cited

U.S. PATENT DOCUMENTS 4,303,858 12/1981 Östrup .................................... 250/328
4,348,588 9/1982 Yrjönen et al. ...................... 250/366
4,582,990 4/1986 Stevens ................................ 250/328

FOREIGN PATENT DOCUMENTS 2307565 11/1976 France ................................. 250/328

Primary Examiner—Paul M. Dzierzynski
Assistant Examiner—Richard Hanig
Attorney, Agent, or Firm—Shea & Gould

[57] ABSTRACT

The invention relates a sample changer mechanism for radioactive samples in gamma counter for use in mass survey comprising two or more well-type detectors (56). The changer mechanism comprises a lifting device (40) for the simultaneous moving several samples (10) from the transfer unit (60) to the measuring unit (50) which includes a detector for each simultaneously measured sample.

According to the invention the detectors (56) in the measuring unit (50) are on the same horizontal plane and are situated in at least two rows placed at intervals so that samples (10) need to be moved in the horizontal plane in one direction only without deviating in lateral direction i.e. the distance of the detectors from each other in the transverse direction, relatively to the transfer movement, equals the distance of the sample containers (17) from each other in the cassette (11).

6 Claims, 5 Drawing Sheets

FIG.2
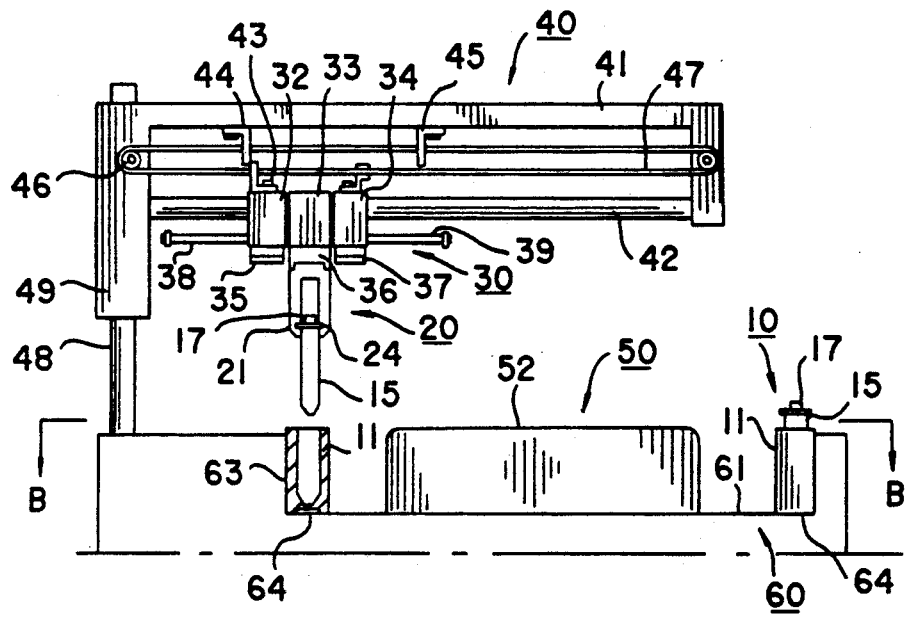
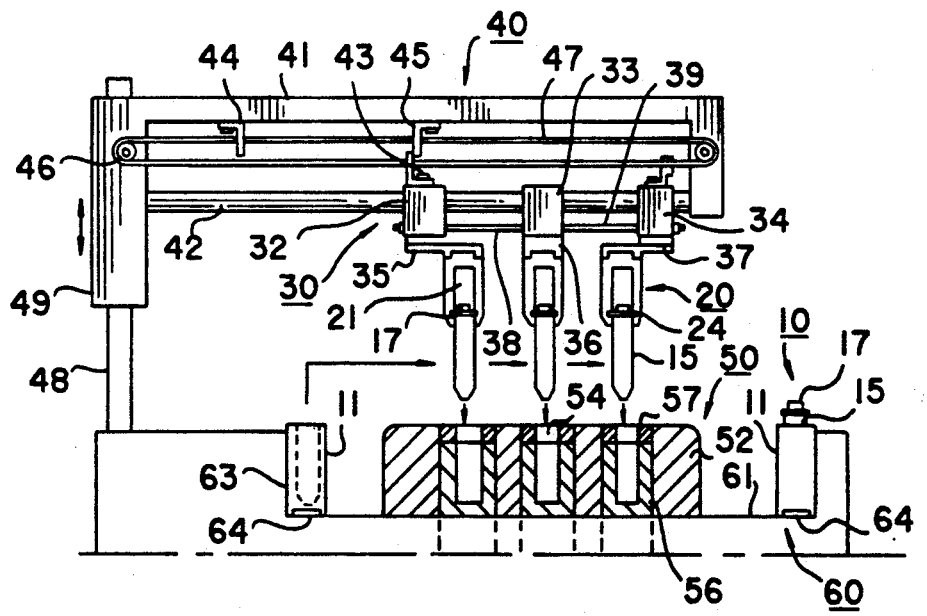
FIG.3

FIG.4
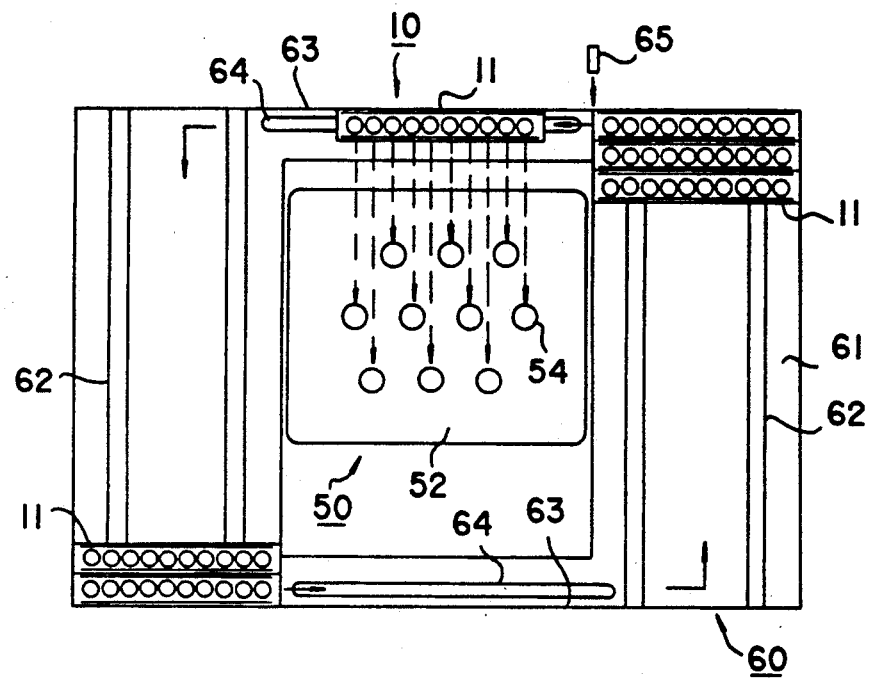
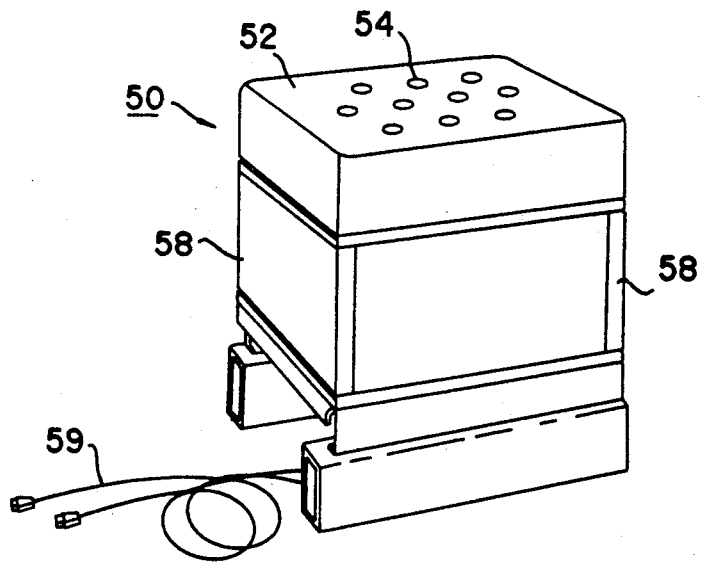
FIG.5

SAMPLE CHANGER MECHANISM FOR RADIOACTIVE SAMPLES IN GAMMA COUNTER FOR USE IN MASS SURVEY

The invention relates to a sample changer mechanism for radioactive samples in gamma counter for use in mass survey comprising two or more well-type detectors, the changer mechanism comprising a lifting device for the simultaneous moving of two or more samples from the transfer unit to the measuring unit for measuring and back therefrom after measuring, and the lifting device comprising a grip unit and grip elements for moving the samples into the measuring unit which includes a detector for each simultaneously measured sample.

Gamma counter measurements of radioactive samples are commonly conducted using either RIA (Radio Immuno Assay) devices, then the question usually being of a mass survey, or research devices, the question being of a single research of a small series only. RIA devices must be fast and therefore they handle several samples simultaneously. A research device need not be so fast but samples may, instead, be in containers or cassettes of different sizes. The radioactive isotope of the samples may also emit high energy radiation and therefore the detector of a research device must be larger and the lead shield must be much better than in a RIA device.

Either well-type or diametrically through hole-type detectors are generally used in counters. Well-type detectors are provided with a hollow, formed in the detector material, in which the sample is inserted. In hole-type detectors a hole goes through the detector material into which the sample is lifted. A well-type detector is easier to manufacture. It also has better efficiency and it is easier to shield than a hole-type detector.

Known gamma counters have been presented e.g. in the U.S. Pat. No. 4,029,961 and 4,035,642. In these devices the sample vials to be measured have been placed in cassettes of ten vials and the measuring device takes one cassette at a time for measuring. As there are ten gamma detectors in the device, all samples in the cassette can be measured simultaneously. However, this kind of device is only suitable for use in RIA measurements because it would become too large and expensive for use in research if manufactured using known technique. Moreover, one cannot use a well-type detector in this kind of device because the sample is lifted into the detector.

For economical reasons, research devices have only one large and well shielded detector. Since it has not been possible to combine RIA devices and research devices, those isotope laboratories which want to do both RIA counting and actual gamma research have been forced to purchase two separate counters. Therefore, for economical reasons, counters are also manufactured with 1, 2, or 4 detectors. They are larger and better shielded than necessary in actual RIA work and therefore they can, to a certain extent, be also used in research work. However, the drawback in RIA work is lower speed compared to actual RIA devices and limited efficiency in research work. Furthermore, the volume of samples cannot exceed that of RIA samples.

The object of this invention is to provide a new changer mechanism for a RIA gamma counter device. The invention is characterized in, that principally all detectors of the measuring unit are on the same horizontal plane and, viewed from above, form a figure which differs from a straight row, and that the lifting device is designed to group the samples according to the figure formed by the detectors so that the samples can be lowered into contact with the detectors simultaneously.

The other characteristics of the invention have been set forth in the ensuing claims.

The invention will now be described by means of examples referring to the enclosed drawings in which FIG. 1 shows an axonometric view of a gamma counter according to the invention.

FIG. 2 shows the gamma counter of FIG. 1 viewed from the side.

FIG. 3 corresponds to FIG. 2 and shows the gamma counter moving the sample containers into the measuring unit.

FIG. 4 shows a sectional view taken along the line B—B in FIG. 2.

FIG. 5 shows the measuring unit of the gamma counter of FIG. 1.

Figure 1:
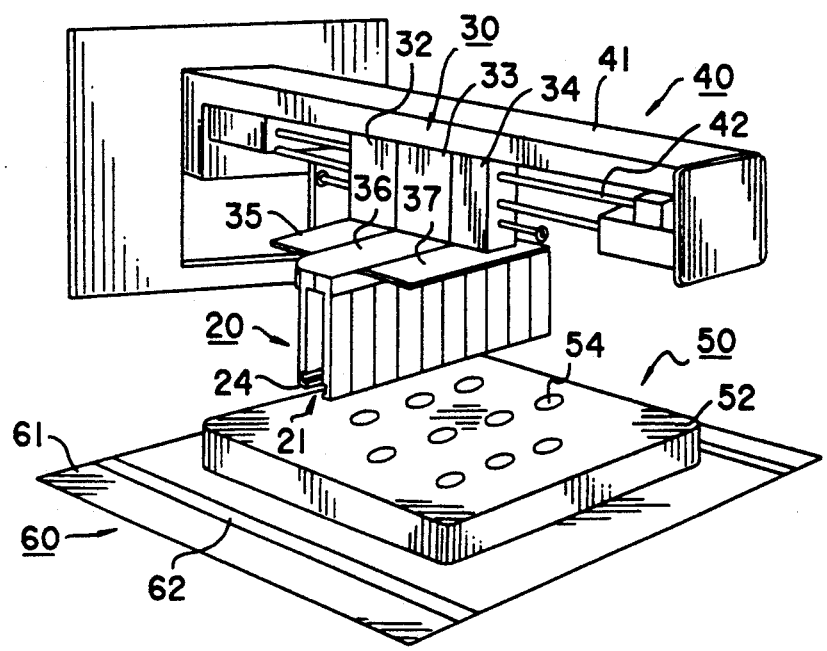
FIG. 1 shows a gamma counter for use in RIA (Radio Immuno Assay) or in mass survey. In this embodiment the measuring unit 50 contains a measuring chamber 52 with ten detectors, whose lead shield need not be as massive and thick-walled lead shield as in a research device.

The lifting mechanism 40 is designed so that it can lift ten sample container holders simultaneously. The cantilever beam 41 is the same as that of the gamma counter of FIG. 1 and the cantilever beam 41 can be moved in vertical direction in order to lift the sample container holders out of the sample container holder cassette and to lower them into the measuring unit 50. The guide bar 42 of the cantilever beam 41 has been provided with three slides 32, 33, and 34, mounting plates 35, 36, and 37 for the grip elements being attached thereto. The grip elements 21 are composed of ten pairs of grip nails 24, being attached to these mounting plates. The distance between the grip nails 24 is the same in all of them and therefore they can grip only a sample container holder of a predetermined size.

Operation of the device of FIG. 1 is described in greater detail in the following figures.

FIG. 2 shows the gamma counter of FIG. 1 viewed from the side. Sample container cassettes 11, which contain sample container holders 15 and, inside them, sample containers 17, are placed in the cassette transfer unit 60 on the measuring table 61, being in connection with a conveyor which moves one cassette at a time to a lifting position of the sample containers. In the figure, its location is in the left corner of the measuring table 61. In this gamma counter one can use only sample containers and their cassettes of one size because all of the ten grip elements 21 in the grip unit 20 are of the same size.

The lifting device 40 accomplishes the transfer of samples to the measuring unit 50 for measuring. The transfer unit 30 is moved on a horizontal guide bar 42 of the cantilever beam 41 by means of a cogged belt and an electric motor 46. In this embodiment the transfer device 30 is composed of three slides 32, 33, and 34 to which the mounting plates 35, 36, and 37 have been attached. On the other hand, being attached to these, there are altogether ten suspension means 21 for the sample container holders 15, locating in a straight row when slides 35, 36, and 34 are adjacent to each other. When the cassette moves from the side to the lifting position, the grip elements 21 grip all the ten samples in the cassette 11 simultaneously.

The grip nails 24 will subsequently lift all the ten sample container holders 15 along with their sample containers 17 simultaneously up out of the cassette 11. The vertical movement has been arranged so that the whole cantilever beam 41 rises on the guide bars 48.

FIG. 3 illustrates a situation where the transfer unit 30 of the gamma counter of FIG. 5 has moved the holders 15 of the sample vials in the horizontal direction. The mechanism functions so that the sample containers move into three rows, at a distance from each other, so that every sample container comes right above the corresponding hole 54 of the measuring unit 50. The transfer movement is performed so that the electric motor 46 moves the cogged belt 47 having a slide 34 attached thereto, the slide moving on the guide bar 42. Since the slides 32, 33, and 34 are connected to each other by means of limiting bars 38 and 39, being attached to slide 33, the slide 34 will draw the other slides 32 and 33 along.

The lengths of the limiting bars 38 and 39 define the distances between the rows of sample containers, resting on the grip elements 21, in such a way that they correspond to the distances of the detectors 56 from each other in the measuring unit 50 in the direction of the guide bar 42. A stop 45, being attached to the body of the cantilever beam 41, or a sensor, placed in the corresponding position, stops the transfer movement of slides 32, 33, and 34 exactly in the right position above the measuring unit 50 by means of a stop 43 attached to the slide 32.

After this the cantilever beam 41 on the whole is lowered and the sample vials 17 along with their holders go down into the measuring hollows where there are ten well-type detectors 56 in three rows. Detectors 23 have been installed from above down into their hollows and protective rings 57 have been mounted on top of them. Then also the exchange of detector is easy to do from above.

Reversed movement or the return movement of the sample containers into the cassettes 11 is performed in reversed order. When the sample containers have been lifted up out of the measuring unit 50, the cogged belt 47, moved by the electric motor 56, moves the slide 34 in FIG. 6 to the left. Then all slides come adjacent to each other and the slide 34 pushes also the slides 32 and 33. Movement stops when the stop 43, being attached to the slide 32, hits the stop 44, being attached to the body of the cantilever beam 41. From this on the situation corresponds to that shown in FIG. 2.

FIG. 4 shows a RIA gamma counter. Measuring table 61, having the measuring unit 50 in the middle, forms the cassette transfer unit 60. The measuring chamber 52 of the measuring unit includes ten detectors placed in three rows. All sample container cassettes 11 in this device must be the same size. Sample container cassettes 11 are placed on the table 61 where they are transferred in turn for measuring by means of conveyors 62. The cassettes rotate along a path round the measuring unit 50. This device is suitable for use in mass survey where a lot of samples are measured as fast as possible. Then the tracer materials in the samples are generally of low energy and the detectors need not be large and the lead walls of the measuring chamber need not be very thick. The transfer mechanism of the samples is shown in FIGS. 2 and 3 and in greater detail in FIG. 9.

The measuring unit 50 of the RIA device is shown in FIG. 5 having ten detectors in three rows in the measuring chamber 52 the lead walls 58 being relatively thin.

Figure 6:
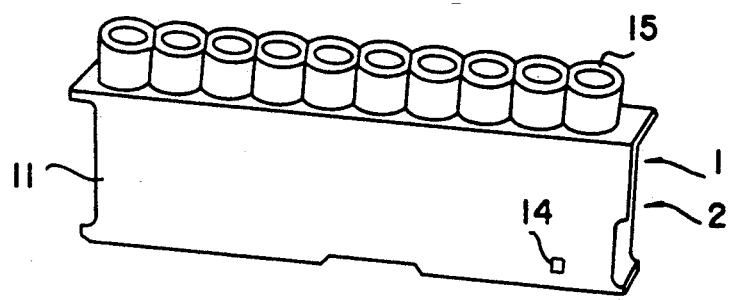
FIG. 6 shows the sample container cassette movable on the transfer table of the gamma counter of FIG. 4.

The sample container cassette 11 used in RIA devices according to the invention is shown in FIG. 6. It can take ten sample containers.

Figure 7:
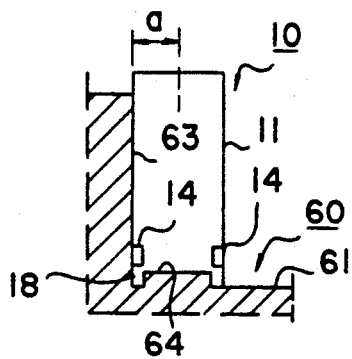
FIG. 7 shows the sample cassette, viewed from the end, at a position where the samples are being lifted into the measuring unit.

The sample container cassette 11 is schematically shown in FIG. 7 on the table 61 of the transfer unit 60 at a position where the samples are lifted up. It is seen in the figure that there is a guide 64, raising from the surface of the table, formed along the path on the table. A corresponding recess has been formed in the cassette 11 so that on the lower edge of the cassette a guide edge 18 is formed, the width corresponding the distance between the guide 64 on the table and the edge 63 of the table. As the guide edge 18 of the cassette moves in the groove between the guide and the table edge, the cassette stays sideways firmly in place with its other side leaning against the edge 63 of the measuring table. The forward transfer movement of the cassette is performed so that the nail of the pulling device inside the table edge 63 grips the opening 14 on the side wall of the cassette. At the same time, this nail of the pulling device in the opening of the cassette prevents the cassette from rising and the cassette is held firmly on the path 61 also in vertical direction.

Figure 8:
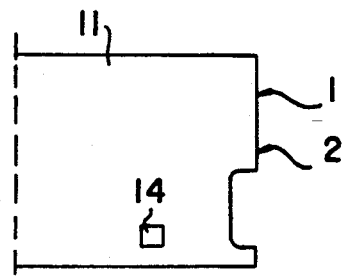
FIG. 8 shows the end of the sample cassette of FIG. 7, viewed from the side.

The end of the cassette 11 seen from the side is shown in FIG. 8. The opening 14, on the side of the cassette, for the nail of the pulling device can be seen in the figure.

Figure 9:
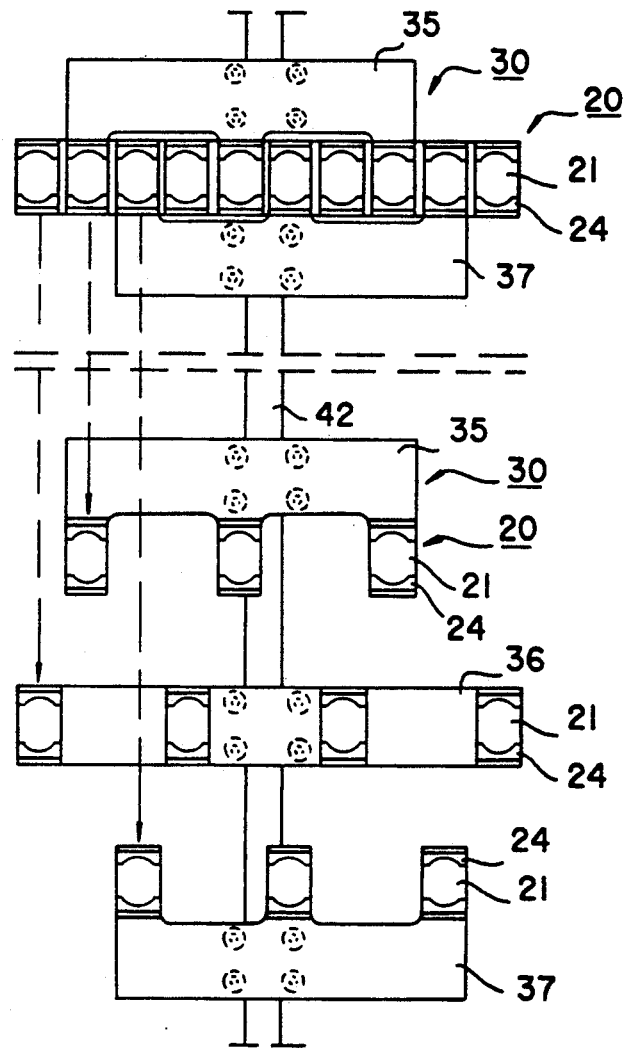
FIG. 9 shows, viewed from behind, the grip elements of the gamma counter of FIG. 1 and schematically their horizontal transfer movement.

In FIG. 9 the grip elements 21 and their mounting plates 35, 36, and 37 of the sample container holders are shown from below. In the upper part of the figure, a situation has been shown where the mounting plates are adjacent to each other and all the grip elements 21 are in the same line. In this position the sample container cassette is transferred from the side under the grip elements or, in FIG. 4 for instance, from right to left. The nails 24 will then grip the edge of the sample container holders so that the holders along with the containers can be lifted up and transferred to the measuring unit.

FIG. 9 also shows that, while moving horizontally on the guide bar 42, the mounting plates 35, 36, and 37 are separating from each other so that the sample vial holders, resting on the grip elements 21, are moving into three rows forming a figure that corresponds to that of FIG. 4 formed by the detectors of the measuring unit 50.

It is obvious to a specialist that the different embodiments of the invention can vary within the scope of the ensuing claims.

We claim:

1. Sample changer mechanism for radioactive samples in a gamma counter for use in mass survey comprising:

two or more well-type detectors, a lifting device for the simultaneous moving of two or more samples from a cassette of a transfer unit each to a respective well-type detector in a measuring unit for simultaneous measuring and back therefrom after measuring, the lifting device comprising a grip unit and two or more grip elements each for gripping and moving a respective sample into a respective well-type detector of the measuring unit, wherein the two or more samples while in said cassette are in a row and the detectors of the measuring unit are on the same horizontal plane and, viewed from above, are non-parallel to said row, the lifting device simultaneously moving the samples from said row in said cassette to positions above the respective detectors, the samples being simultaneously lowered into the detectors by said lifting device for simultaneous measuring.

2. Sample changer mechanism according to claim 1, wherein the detectors of the measuring unit are situated in at least two rows placed at intervals so that samples need to be moved from positions above the cassette in the horizontal plane in one horizontal direction only to reach positions above respective detectors without movement in a second horizontal direction.

3. Sample changer mechanism according to claim 1 or 2, wherein the distance of the detectors from each other in the traverse direction, relative to the transfer movement, equals the distance of the samples from each other when in the cassette.

4. Sample changer mechanism according to claim 1 or 2, wherein the detectors of the measuring unit are arranged in at least two rows, and the grip unit of the lifting device includes, on a horizontal guide bar, at least two slides which move the samples from one row in the cassette, into said at least two rows of the detectors of the measuring unit.

5. Sample changer mechanism according to claim 3, wherein the detectors of the measuring unit are arranged in at least two rows, and the grip unit of the lifting device includes, on a horizontal guide bar, at least two slides which move the samples from one row in the cassette, into said at least two rows of the detectors of the measuring unit.

6. Sample changer mechanism for radioactive samples in a gamma counter for use in mass survey comprising:

three or more well-type detectors;

a lifting device for the simultaneous moving of three or more samples from a cassette of a transfer unit each to a respective well-type detector in a measuring unit for simultaneous measuring and back therefrom after measuring, the lifting device comprising a grip unit and three or more grip elements each for gripping and moving a respective sample into a respective well-type detector of the measuring unit;

wherein the three or more detectors of the measuring unit are on the same horizontal plane and, viewed from above, are staggered, the lifting device simultaneously moving the samples from the cassette to positions above the respective staggered detectors, the samples being simultaneously lowered into the detectors by said lifting device for simultaneous measuring.

* * * * *